Oct. 14, 1958 H. M. PURDY 2,856,226
VEHICLE FRAME ASSEMBLY
Filed Jan. 19, 1955 3 Sheets-Sheet 1
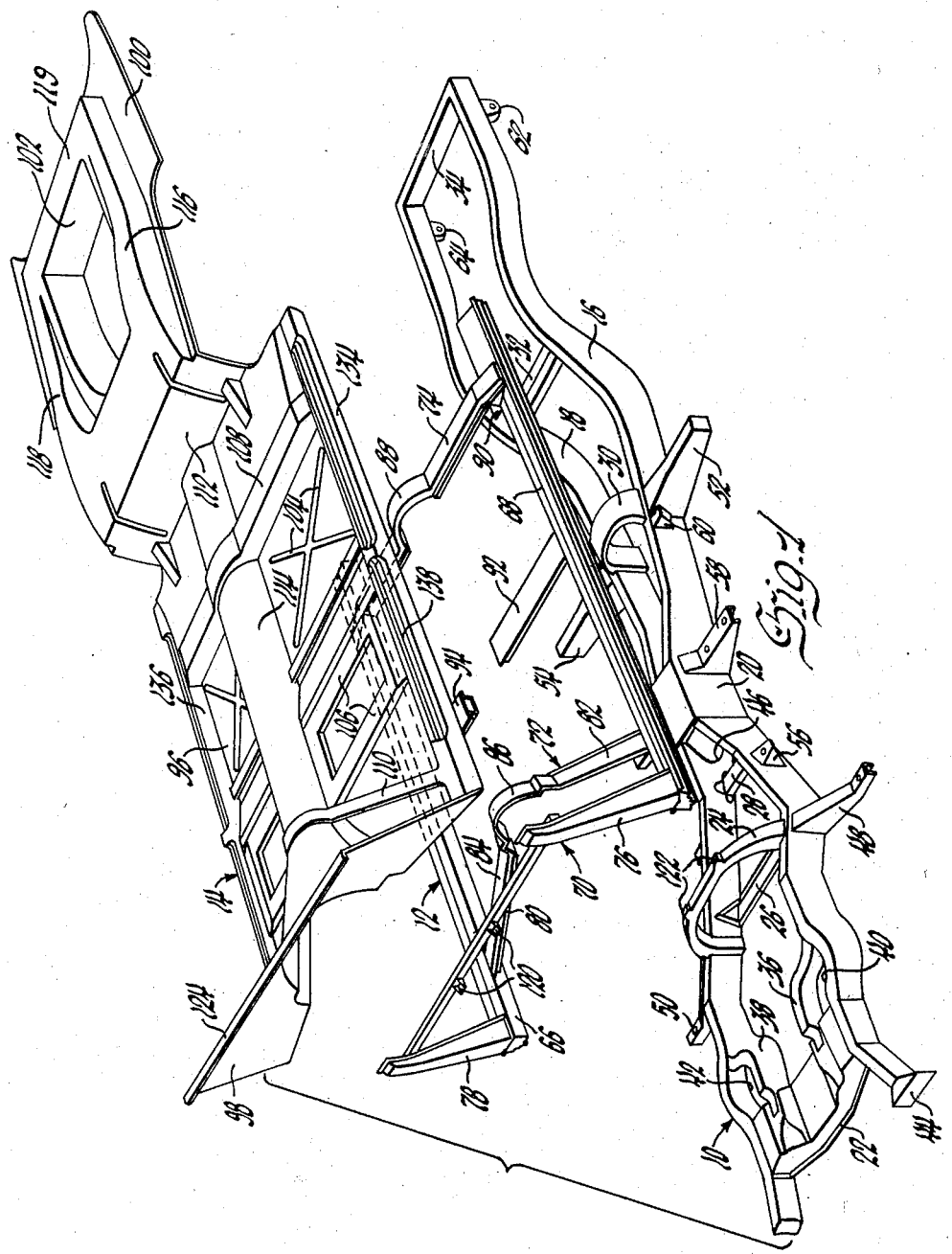
INVENTOR
Harry M. Purdy
BY
L. D. Burch
ATTORNEY

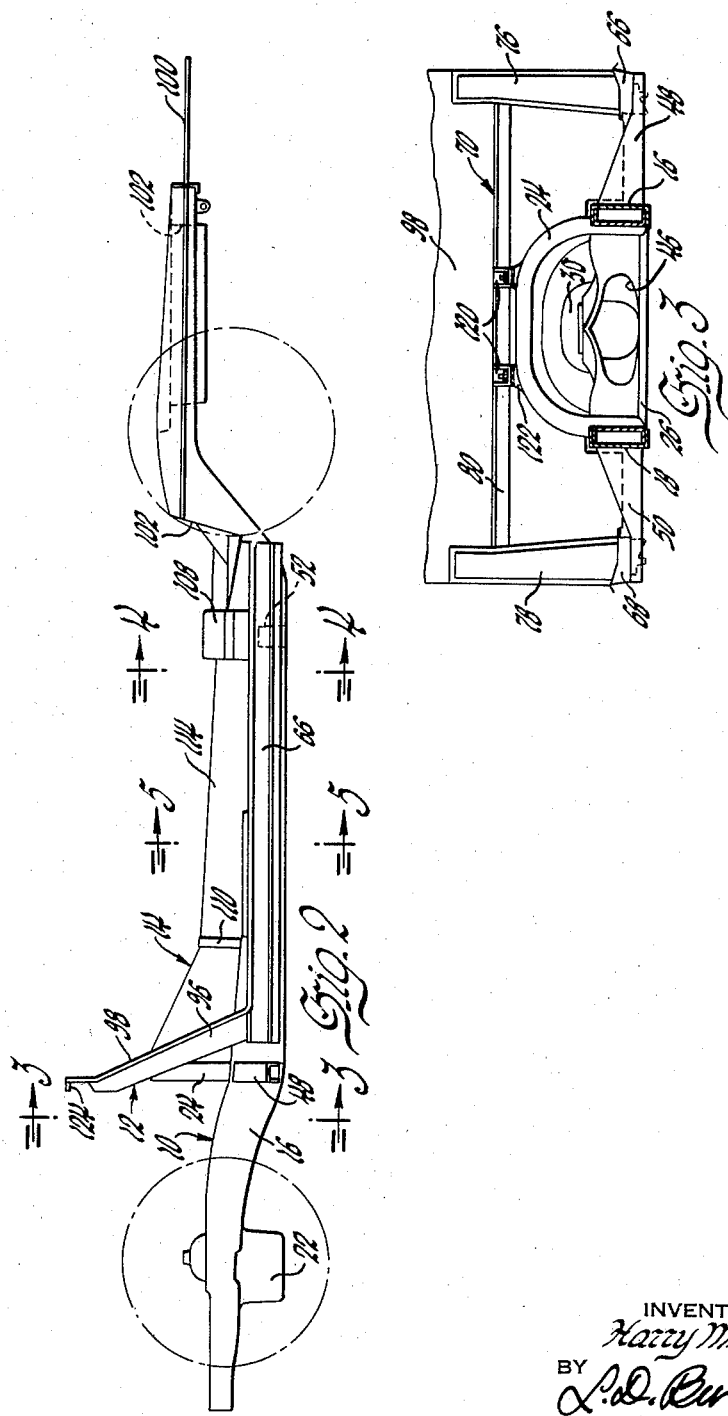

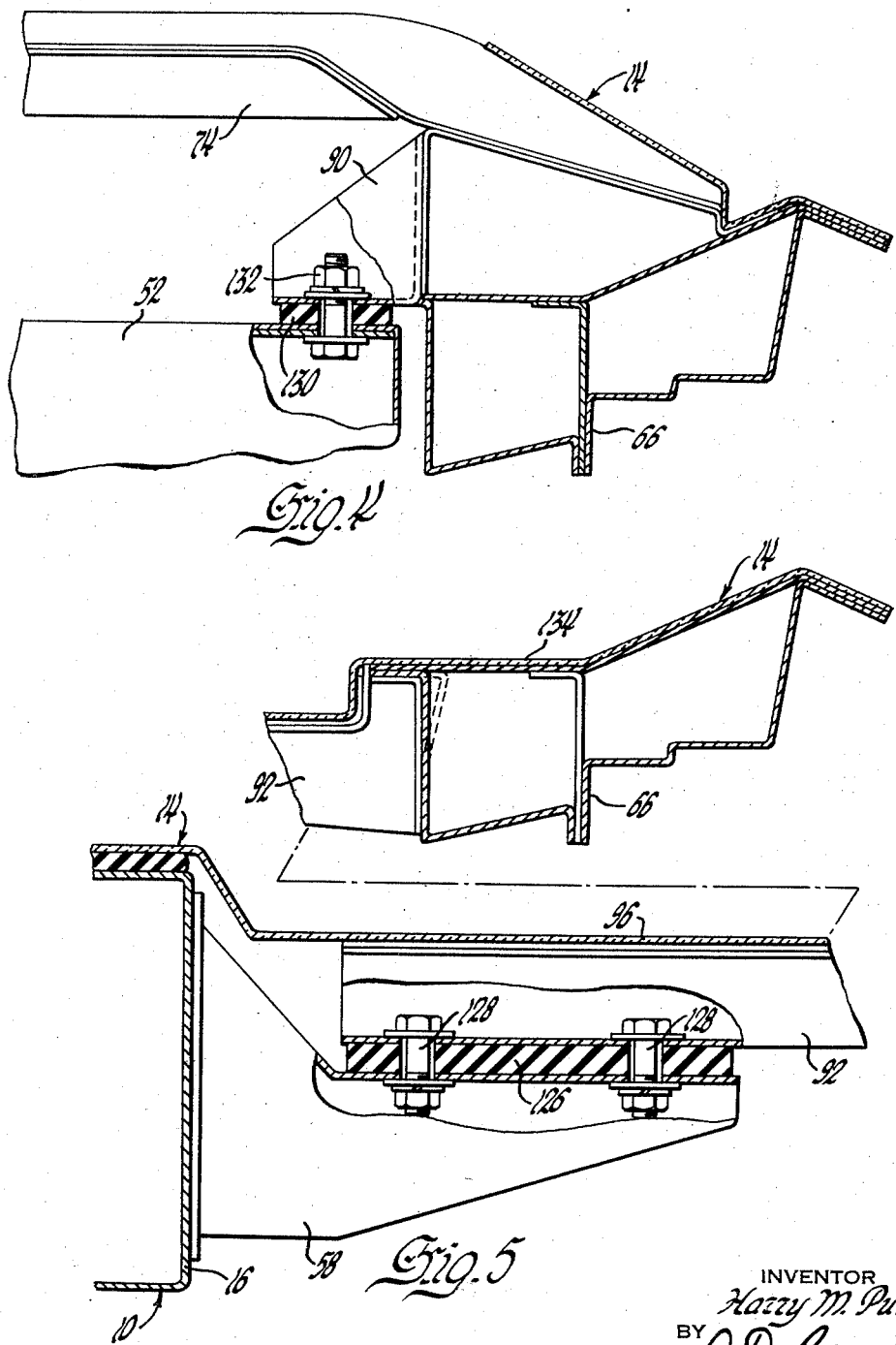

United States Patent Office 2,856,226
Patented Oct. 14, 1958

2,856,226

VEHICLE FRAME ASSEMBLY

Harry M. Purdy, Detroit, Mich., assignor to General Motors Corporation, Detroit, Mich., a corporation of Delaware Application January 19, 1955, Serial No. 482,804

5 Claims. (Cl. 296—28)

This invention relates to vehicle construction in general and more particularly to frame and underbody assemblies adaptable for use with automotive and other vehicles.

Several different types of frames have been used in vehicle construction. These include the box frame having transverse or diagonal cross braces, the cruciform type frame, and the backbone frame with spaced outriggers for supporting the vehicle underbody and chassis components. Each of these types of frames has certain advantages and certain disadvantages. The box frame is easy to manufacture with transverse cross braces but is not as sturdy as when including the diagonal braces. However, diagonal bracing is more expensive and adds appreciable weight to the vehicle. The cruciform frame is sturdy and requires less materials but provides no body supporting side rails. The backbone frame likewise provides no side rails and while the frame is less expensive to manufacture, the outrigger means are less acceptable for supporting the chassis components and require a much more sturdy underbody than other type frames.

It is now proposed to provide a vehicle frame including the best features of the frame types just mentioned. The proposed vehicle frame includes an underframe of cruciform type which is more narrow than conventional cruciform type frames and which forms the backbone structure of the proposed frame assembly. The narrow cruciform underframe has transverse cross bracing and includes outriggers, similar to those employed with the backbone type frame, which are adapted to assist in supporting a subframe member. The subframe member includes parallel spaced side rails and transverse cross members which are secured to the underframe outriggers and cross members. A vehicle underbody or floor pan is received upon the subframe and underframe to provide increased structural strength to the frame assembly. The underbody may be made by a stamping operation to include reinforcement ribs but is otherwise of relatively simple construction. The major chassis components may be mounted upon the underframe where they are more substantially supported, while those components requiring less structural support may be accommodated by the frame outriggers. In this respect, means are provided for mounting a vehicle engine upon and within the underframe and for receiving the rear axle drive means therethrough.

The proposed frame assembly with the superimposed underbody is sturdy in construction and includes separate elements which are relatively easy to manufacture and may be readily assembled. The frame assembly has the simplicity of the backbone type frame, the structural strength of the box frame and diagonal cross bracing, includes extended side rails for providing greater vehicle floor width, and is adaptable for mass production vehicle assembly being of acceptable weight, cost, strength and simplicity.

In the drawing:

Figure 1 is an exploded perspective view of the frame assembly including the underframe, subframe and underbody.

Figure 2 is a side view of the proposed vehicle frame and underbody as assembled.

Figure 3 is a front sectional view of the proposed vehicle frame assembly as taken in the plane of line 3—3 looking in the direction of the arrows thereon.

Figure 4 is an enlarged cross-sectional view of a part of the frame assembly as seen in the plane of line 4—4 of Figure 2 looking in the direction of the arrows thereon.

Figure 5 is an enlarged cross-sectional view of another part of the frame assembly as seen in the plane of line 5—5 of Figure 2 looking in the direction of the arrows thereon.

The vehicle frame assembly shown includes an underframe 10, subframe 12 and underbody or vehicle floor unit 14. The underframe 10 is a cruciform frame member having side rails 16 and 18 which are joined and boxed together as at 20. The cruciform underframe 10 is more narrow than conventional cruciform frames and thereby approaches a backbone type frame. The underframe side rails 16 and 18 are here shown as closed box section rails, though channel or tubular rails may be used equally as well. Cross members 22, 24, 26, 28, 30, 32 and 34 are secured between the underframe side rails 16 and 18 to provide added rigidity to the underframe. The foremost cross member 22 is adapted to support the vehicle engine, not here shown, and has channel rails 36 and 38, from the boxed side rails 16 and 18, formed inwardly and out to provide the front suspension spring pockets 40 and 42. The side rails 16 and 18 extend beyond the cross member 22 for attachment to the vehicle bumper (not shown) as at 44.

The underframe cross bracing members 24 and 30 are bowed or arched to accommodate the vehicle drive means (not shown) as extended rearwardly through the underframe 10 towards the after end thereof. The side rails 16 and 18 are cut away as at 46 in the area of the boxed-in section 20 to allow the drive shaft to extend therethrough. The cross bracing member 24 is arched over the vehicle engine as mounted within the underframe 10 and may have the after end of the engine hung therefrom if desired with the cross bracing straps 26 extended thereunder.

Outriggers 48 and 50 are secured to the underframe side rails 16 and 18 adjacent the cross member 24 and outriggers 52 and 54 are secured adjacent cross member 30. These outriggers 48, 50, 52 and 54 and other support members as 56, 58 and 60 are adapted to have other frame assembly units secured thereto as will be described. The after outriggers 52 and 54 are adapted to support rear vehicle springs (not shown) in cooperation with the spring shackles 62 and 64 secured to the ends of underframe side rails 16 and 18.

The subframe 12 includes parallel spaced side rails 66 and 68 which are secured together by cross bracing members 70, 72 and 74. The foremost cross brace 70 is formed by vertical reinforced columnar struts 76 and 78 inclined forwardly with a tie member 80 secured therebetween. The intermediate cross brace 72 is formed by inclined struts 82 and 84 secured together by a saddle member 86 received over the transmission end of the engine (not shown) as mounted within the underframe 10. The after cross brace 74 also includes a saddle portion 88 which in this instance is received over the bowed cross member 30 of the underframe 10. The cross brace 74 is received upon and secured to the underframe outriggers 52 and 54. The side rails 66 and 68 of the subframe 12 lie in the plane of the underframe side rails 16 and 18 at the ends of the outriggers 52 and 54. Brackets 90 may be secured to the underside of the subframe side rails 66 and 68 to receive and secure the outriggers 52 and 54 thereto. Between cross braces 72 and 74, and secured to opposite subframe side rails 66 and 68, are inwardly extended support struts 92 and 94 which are adapted to be received upon and secured to the underframe support members 58 extended outwardly from side rails 16 and 18 thereof.

The underbody 14 may be made of sheet metal or laminated fiber glass plastic material and is formed to provide a vehicle floor 96, inclined fire wall 98 and raised trunk compartment floor 100 with a sunken spare tire well 102. The underbody may be formed to include reinforcement ribs 104 and channels 106 as desired. The underbody 14 includes transverse channels 108 and 110 received over the subframe cross braces 72 and 74. Support struts 92 and 94 of the subframe are received within channels 106 formed in the underbody.

The rear trunk compartment floor 100 of the underbody is disposed upon the rear portion of the underframe 10 and is joined to the vehicle floor pan 96 by the vertical end wall 112. The drive shaft tunnel 114 is formed in the floor pan 96 between the fire wall 98 and end wall 112. The trunk compartment floor 100 is formed to receive the ends of the underframe side rails 16 and 18 within channeled sections 116 and 118 thereof and includes the transverse channel section 119 receiving underframe cross member 34. The floor 100 may extend beyond the extremity of the underframe as is shown in Figure 2 of the drawings.

The subframe 12 is secured to the underframe 10 in the present instance by means of subframe cross braces 70 and 74 and support struts 92 and 94. The tie member 80 of cross brace 70 includes brackets 120 which are received upon and secured to the arched underframe cross brace member 24 as at 122. The foremost end of the subframe 14 is thus supported centrally upon the arched frame cross member 24. The underbody fire wall 98 is secured to the columnar struts 76 and 78 and tie member 80 and includes a flange 124 formed across the upper edge thereof. The subframe support struts 92 and 94 are received by the underframe support members 58 upon mounting pads 126 and are secured thereto by fastening means 128. The rear end of the subframe 14 is similarly mounted to the underframe 10, namely by mounting pads 130 disposed between subframe brackets 90 and underframe outriggers 52 and 54 with fastening means 132 extended therethrough.

The outriggers 48 and 50 are not adapted to support the subframe 12 in the present instance. Outriggers 48 and 50 extend outward in front of and beyond the side rails 66 and 68 of the subframe 12 and may be used to support the front fenders and cowl section of the vehicle body (not shown). Other means for supporting the forward part of the vehicle body may be used in which case the outriggers 48 and 50 may be eliminated.

The underbody 14 is formed to include channeled side rails 134 and 136 which are received over the subframe side rails 66 and 68 and which may be formed to provide vehicle door sills 138. The use of the underbody channeled side rails 134 and 136 enable providing a lower vehicle floor level as is evidenced in Figure 5 of the drawings.

The cruciform underframe 10 is narrow enough to include the characteristics of a backbone type frame and with the subframe 12 secured to the underbody 14 the frame assembly is as sturdy as the conventional box frame with diagonal cross braces in addition to having the body supporting side rails, here 66 and 68 of the subframe, disposed farther outboard to permit greater vehicle floor width. The underbody 14 may be made by a simple form or stamping operation to include the channeled portions and as secured upon the underframe 10 and subframe 12 adds appreciably to the structural strength of the frame assembly.

The claims:
1. A vehicle frame assembly including spaced side rails converging and secured together intermediate the ends thereof to form a narrow cruciform backbone like frame member and having outriggers secured to said side rails, a separate subframe including parallel spaced lateral side rails having transverse cross members secured therebetween and adapted to have the vehicle underbody floor pan secured thereto, and means for securing said cross members to said outriggers for disposing said side rails to receive the outer extremities of a vehicle body and underbody member upon said frame assembly.

2. A vehicle frame assembly which includes a cruciform underframe including transversely extended cross braces and outriggers, a subframe member including parallel spaced lateral side rails and transversely extending cross members secured therebetween, means for securing said cross members to said outriggers in the assembly of said subframe to said underframe, and an underbody received upon said subframe and underframe as assembled and secured thereto to provide added structural strength to said frame assembly.

3. A vehicle frame assembly including an underframe having intersecting side rails and transversely extended outriggers secured to the sides thereof, means for supporting a vehicle engine within said underframe, a bowed cross member secured between said underframe side rails, a subframe including parallel spaced side rails having cross braces secured therebetween, and means for centrally securing one end of said subframe to said bowed cross member substantially above said spaced side rails and the other end thereof to said outriggers, said parallel side rails of said subframe being disposed in the plane of said underframe and said outriggers.

4. A vehicle frame assembly which includes underframe, subframe and underbody members adapted to be assembled together, said underframe comprising closely disposed side rails converging and secured together intermediate the ends thereof to form a narrow backbone like underframe and having outriggers secured to the sides thereof, said subframe including parallel spaced side rails having cross braces secured therebetween and disposed to be received upon said outriggers, said underbody including a floor pan member formed to cover said underframe and subframe and having channeled recesses formed therein to receive parts of said underframe and subframe members, and means securing said outriggers to said cross braces and within said channeled recesses in the assembly of said vehicle frame members.

5. A vehicle frame assembly comprising a vehicle underframe including closely disposed side rails converging and secured together intermediate the ends thereof to form a narrow backbone like structure and having outriggers secured to and extended outwardly from said side rails, a vehicle underbody including a subframe assembly having parallel spaced lateral side rails including cross braces secured therebetween and disposed to be received upon said outriggers, said underbody further including a floor pan member formed to cover said underframe and subframe assemblies and having channeled recesses formed therein for receiving said cross braces and outriggers, and means securing said outriggers to said cross brace and within said channeled recesses in the final assembly of said vehicle frame.

References Cited in the file of this patent
UNITED STATES PATENTS

| | | |
|---|---|---|
| 2,228,740 | Wagner et al. | Jan. 14, 1941 |
| 2,384,096 | Kishline | Sept. 4, 1945 |
| 2,637,592 | Karlby | May 5, 1953 |
| 2,639,186 | Sewelin | May 19, 1953 |
| 2,711,340 | Lindsay | June 21, 1955 |
| 2,754,146 | Feil | July 10, 1956 |

OTHER REFERENCES

"Body Engineering," in "Autocar" magazine, Feb. 14, 1947, pages 142–144.